(12) United States Patent
Foley et al.

(10) Patent No.: US 7,305,353 B1
(45) Date of Patent: Dec. 4, 2007

(54) SYSTEM AND METHOD FOR FORECASTING TAX EFFECTS OF FINANCIAL TRANSACTIONS

(75) Inventors: John T. Foley, San Francisco, CA (US); Steven Nicklanovich, Novato, CA (US)

(73) Assignee: Charles Schwab Co., Inc., San Francisco, CA (US)

( * ) Notice: Subject to any disclaimer, the term of this patent is extended or adjusted under 35 U.S.C. 154(b) by 781 days.

(21) Appl. No.: 09/798,110

(22) Filed: Mar. 1, 2001

(51) Int. Cl.
*G06Q 40/00* (2006.01)

(52) U.S. Cl. .................. 705/19; 364/408; 364/300; 364/401; 364/402; 705/36; 705/37; 705/40; 705/35; 235/184; 235/492; 395/600; 395/144; 395/204; 395/239

(58) Field of Classification Search .......... 705/19, 705/35, 36, 37, 40; 364/300, 401, 402, 408; 235/184, 492; 395/144, 204, 239, 600
See application file for complete search history.

(56) References Cited

U.S. PATENT DOCUMENTS

| | | | |
|---|---|---|---|
| 3,634,669 A | 1/1972 | Soumas et al. | 235/184 |
| 3,697,693 A | 10/1972 | Deschenes et al. | 179/2 DP |
| 4,007,355 A | 2/1977 | Moreno | 235/61.7 R |
| 4,334,270 A | 6/1982 | Towers | 364/300 |
| 4,346,442 A | 8/1982 | Musmanno | 364/408 |
| 4,376,978 A | 3/1983 | Musmanno | 364/408 |
| 4,597,046 A | 6/1986 | Musmanno et al. | 346/408 |
| 4,642,767 A | 2/1987 | Lerner | 364/406 |
| 4,742,457 A | 5/1988 | Leon et al. | 364/408 |
| 4,752,877 A | 6/1988 | Roberts et al. | 346/408 |
| 4,774,663 A | 9/1988 | Musmanno et al. | 364/408 |
| 4,868,376 A | 9/1989 | Lessin et al. | 235/492 |
| 4,876,648 A | 10/1989 | Lloyd | 364/408 |
| 4,885,685 A | 12/1989 | Wolfberg et al. | 364/401 |
| 4,910,676 A | 3/1990 | Alldredge | 364/408 |

(Continued)

FOREIGN PATENT DOCUMENTS

EP   0 572 281   5/1993

(Continued)

OTHER PUBLICATIONS

Taxing Questions: Claiming depreciation on intangible assets by Chandrashekhar Chitale, Times of India, Apr. 10, 2000, pp. 1-2.*

(Continued)

*Primary Examiner*—F. Zeender
*Assistant Examiner*—Fawaad Haider
(74) *Attorney, Agent, or Firm*—Townsend and Townsend and Crew LLP

(57) ABSTRACT

A system and method for forecasting tax effects of financial transactions is provided. The system and method include a series of web pages. The web pages allow a user to 1) determine their federal and state tax rates, 2) describe the asset they wish to sell. Additional web pages then display the tax consequences of the sale of the asset along with the details of the calculations used to evaluate those consequences. Still more web pages can be used to describe an asset to buy. In this case, the displayed consequences are expanded to compare the benefit of holding the current asset against the benefit of acquiring the new asset.

4 Claims, 17 Drawing Sheets

U.S. PATENT DOCUMENTS

| | | | | |
|---|---|---|---|---|
| 4,933,842 | A | 6/1990 | Durbin et al. | 364/408 |
| 4,953,085 | A | 8/1990 | Atkins | 364/408 |
| 4,989,141 | A | 1/1991 | Lyons et al. | 364/408 |
| 5,025,138 | A | 6/1991 | Cuervo | 235/379 |
| 5,101,353 | A | 3/1992 | Lupien et al. | 364/408 |
| 5,126,936 | A | 6/1992 | Champion et al. | 364/408 |
| 5,132,899 | A | 7/1992 | Fox | 364/408 |
| 5,148,365 | A | 9/1992 | Dembo | 364/402 |
| 5,220,500 | A | 6/1993 | Baird et al. | 364/408 |
| 5,222,019 | A | 6/1993 | Yoshino et al. | 364/408 |
| 5,227,967 | A | 7/1993 | Bailey | 364/408 |
| 5,237,500 | A | 8/1993 | Perg et al. | 364/408 |
| 5,335,169 | A * | 8/1994 | Chong | 705/31 |
| 5,454,104 | A | 9/1995 | Steidlmayer et al. | 395/600 |
| 5,471,575 | A | 11/1995 | Giansante | 395/144 |
| 5,523,942 | A | 6/1996 | Tyler et al. | 364/401 |
| 5,563,783 | A | 10/1996 | Stolfo et al. | 364/408 |
| 5,590,037 | A | 12/1996 | Ryan et al. | 395/204 |
| 5,592,379 | A | 1/1997 | Finfrock et al. | 395/239 |
| 5,644,727 | A | 7/1997 | Atkins | 395/240 |
| 5,692,233 | A | 11/1997 | Garman | 705/36 |
| 5,774,872 | A * | 6/1998 | Golden et al. | 705/19 |
| 5,784,696 | A | 7/1998 | Melnikoff | 705/36 |
| 5,812,987 | A | 9/1998 | Luskin et al. | 705/36 |
| 5,819,238 | A * | 10/1998 | Fernholz | 705/36 |
| 5,864,827 | A | 1/1999 | Wilson | 705/35 |
| 5,864,828 | A | 1/1999 | Atkins | 705/36 |
| 5,875,437 | A | 2/1999 | Atkins | 705/40 |
| 5,884,283 | A | 3/1999 | Manos | 705/30 |
| 5,884,285 | A | 3/1999 | Atkins | 705/36 |
| 5,884,287 | A | 3/1999 | Edesess | 705/36 |
| 5,907,801 | A | 5/1999 | Albert et al. | 455/406 |
| 5,911,135 | A | 6/1999 | Atkins | 705/36 |
| 5,911,136 | A * | 6/1999 | Atkins | 705/36 |
| 5,918,217 | A * | 6/1999 | Maggioncalda et al. | 705/36 |
| 5,918,218 | A | 6/1999 | Harris et al. | 705/37 |
| H1830 | H * | 1/2000 | Petrimoulx et al. | 111/31 |
| 6,012,044 | A * | 1/2000 | Maggioncalda et al. | 705/36 |
| 6,016,479 | A * | 1/2000 | Taricani, Jr. | 705/19 |
| 6,021,397 | A * | 2/2000 | Jones et al. | 705/36 |
| 6,029,146 | A * | 2/2000 | Hawkins et al. | 705/35 |
| 6,078,898 | A * | 6/2000 | Davis et al. | 705/19 |
| 6,161,098 | A * | 12/2000 | Wallman | 705/36 |
| 6,240,399 | B1 * | 5/2001 | Frank et al. | 705/36 |
| 6,282,520 | B1 * | 8/2001 | Schirripa | 705/36 |
| 6,332,132 | B1 * | 12/2001 | Halpern | 705/36 |
| 6,347,304 | B1 * | 2/2002 | Taricani, Jr. | 705/19 |
| 6,405,204 | B1 * | 6/2002 | Baker et al. | 707/100 |
| 6,516,303 | B1 * | 2/2003 | Wallman | 705/36 |
| 6,601,044 | B1 * | 7/2003 | Wallman | 705/36 |
| 6,687,681 | B1 * | 2/2004 | Schulz et al. | 705/36 |
| 6,697,787 | B1 * | 2/2004 | Miller | 705/31 |
| 6,701,298 | B1 * | 3/2004 | Jutsen | 705/7 |
| 6,832,209 | B1 * | 12/2004 | Karp et al. | 705/36 T |
| 7,016,873 | B1 | 3/2006 | Peterson et al. | 705/36 |
| 2002/0091604 | A1 * | 7/2002 | Loeper | 705/36 |

FOREIGN PATENT DOCUMENTS

| | | |
|---|---|---|
| WO | WO 96/06402 | 2/1996 |
| WO | WO 98/13776 | 4/1998 |
| WO | WO 98/44444 | 10/1998 |

OTHER PUBLICATIONS

Tax distortions to cross-border portfolio investment via mutual funds by Steven W Clark. Financial Market Trends, n74, pp. 125-159, Oct. 1999.*

Pending U.S. Appl. No. 09/667,017, filed Sep. 20, 2000, entitled System and Method for Protfolio Analysis, inventors Michelle Swenson et al.

Pending U.S. Appl. No. 09/880,170, filed Jun. 12, 2001, entitled System and Method for Income Planner, inventors Olga Milosavljevic et al.

Pending U.S. Appl. No. 10/210,410, filed Jul. 31, 2002, entitled Method and System for Integrating Investment Advice With Financial Account Statement Information, inventor Robert Oros.

Pending U.S. Appl. No. 10/698,140, filed Oct. 31, 2003, entitled System and Method for Providing Financial Advice for an Investment Portfolio, inventors James Patterson et al.

J. Zweig, "12 Deadly Fund Myths—and how to profit from them," *Money*, Feb. 1996, pp. 86-95.

J. Zweig, "What you can do to stop index funds from blowing up on you when stocks fall," *Money*, Sep. 1997, p. 47.

J. Zweig, "How to Build . . . ," *Money*, Forecast 1997, pp. 82, 84, 86, 88, 91, 93, & 95.

J. Zweig, "How to Beat 77% of Fund Investors Year After Year," *Money*, Aug. 1997, pp. 136-139.

*Business Week*, Section: Science & Technology "A Financial Planner with Nerves of Silicon," Oct. 7, 1985, p. 108.

M. Edesess et al., "Scenario forecasting: Necessity, not choice," *The Journal of Portfolio Management*, Spring 1980, pp. 10-15.

T. Eggenschwiler et al., "ET++SwapsManager: Using Object Technology in the Financial Engineering Domain," *ACM Sigplan Notices*, vol. 27, No. 10, Oct. 1992, pp. 166-177.

H.F. Weiss, "Dialing for Profits." *Personal Computing*, vol. 10, No. 5, May 1986, pp. cover, 3 and 180.

B. Putnam, "Asset allocation—one step at a time," *Global Investor*, Mar. 1997, pp. 67-72.

F. Hickox, "Learning about artificial intelligence," *Institutional Investor*, Jul. 1986, pp. 209-210.

D.L. Jensen et al., "Frontier: A graphical interface for portfolio optimization in a piecewise linear-quadratic risk framework," *IBM Systems Journal*, vol. 31, No. 1, 1992, pp. 62-70.

J. Keyes, "Expert Allocator: Tools for portfolio optimization," *Pension Management*, vol. 32, No. 5, May 1996, 5 pages in length.

A.J. King, "Asymmetric risk measures and tracking models for portfolio optimization under uncertainty," *Annals of Operations Research*, vol. 45, 1993, pp. 165-177.

M. Malliaris et al., "Beating the Best: A Neural Network Challenges the Black-Scholes Formula," *IEEE Computer Society Press*, CA, 1993, pp. 445-449.

C. Nikolopoulos, "A Hybrid Expert System for Investment Advising," *IEEE*, published Jun. 27, 1994, pp. 1818-1820.

I. Schmerken, "Making Risk Analysis Easy as Alpha, Beta," *Wall Street Computer Review*, Jan. 1988, vol. 5, No. 4, pp. 8 12.

W.F. Sharpe, "Asset allocation: Management style and performance measurement," *The Journal of Portfolio Management*, Winter 1992, pp. 7-19.

W.F. Sharpe et al., *Investments*, Chapters 8, 11 and 23, 5th Edition, 1995, pp. 193-231, 293-321, and 827-863.

H. Tanaka et al., "Possibility Portfolio Selection," *IEEE*, Publication date Mar. 20, 1995, pp. 813-818.

"Keeping Up with Technology: The 1991 Software Update," *Trusts & Estates*, vol. 130, No. 6, Jun. 1991, beginning at p. 34 (15 duplexed pages in length).

J. Vörös, "Portfolio analysis—An analytic derivation of the efficient portfolio frontier," *European Journal of Operational Research*, vol. 23, 1986, pp. 294-300.

Wall Street Computer Review, "1990 Buyer's Guide," *Wall Street Computer Review*, 1990, 23 pages in length.

J. Paroush, "Risk and Wealth Effects on Efficient on Efficient Portfolio," *Metroeconomics*, vol. 26, No. 1-3, 1974, pp. 86-96.

K.N. Pantazopoulos et al., "A Knowledge Based System for Evaluation of Option Pricing Algorithms," Publication date Mar. 29, 1998, pp. 123-140.

L. Bellity, "Optimisation Floue Appliquee Au Choix De Portefeuilles," *CCF Recherche & Innovation*, 1994, 8 pages in length.

Ibbotson Associates, *EnCorr*, 1998, 48 pages in length.

Ibbotson Associates, "Interface Institutional Software + Data," 2nd Quarter 1998, vol. Issue 5.2, No. 2, 3 pages in length.

Barra, Inc., "BARRA Provides Combined Style Analysis and asset Allocation Capabilities," *BARRA Portfolio*, 9 pages in length.

Investment Strategies Network, Inc., "Net Results, Your on-line financial advisor," 1995-1997, 97 pages in length.

PCT/US, "International Search Report—PCT/US 98/19920," 3 pages in length.

PCT/US, "International Search Report—PCT/US 98/19951," 3 pages in length.

PCT/US, "International Search Report—PCT/US 98/19952," 3 pages in length.

PCT/US, "International Search Report—PCT/US 98/20709," 3 pages in length.

* cited by examiner

CharlesSchwab
Customer Center | Account | Trade | Quotes & Research | Alerts | Planning | Services

[ Site Map | Log Out ]

Overview | Retirement Planner | Schwab Portfolio Checkup™ | AdvisorSource | Mortgage

Schwab Sell Analyzer

Planning to sell a security or switch to a new investment?
Understand the tax impact of your decision with the Schwab Sell Analyzer

| Page Help |

Analyzer Steps

Overview
Define Tax Status
Describe Sell
Describe Buy
Results
Calculation Details

Calculate tax on a sale >
- Calculate tax on the sale of a stock or mutual fund.
- Assess whether you should hold a short-term gain until eligible for long term tax treatment.

Calculate tax on a sale and compare to a new investment >
- Compare two investments on an after-tax basis.
- Determine minimum return rate and holding period for a new investment to make up for the tax cost of switching investments.

Note: The tax rates used throughout this tool are for tax year 2000.

---

Account | Trade | Quotes & Research | Alerts | Planning | Services      [ Site Map] [ Return to Top]

Overview | Retirement Planner | Schwab Portfolio Checkup™ | AdvisorSource | Mortgage © 2000 Charles Schwab & Co., Inc. All rights reserved. Member SIPC/NYSE
Unauthorized access is prohibited. Usage will be monitored
Agreements Account Number 8967-5843
Viewed on January 14, 2000 01:10PM ET
(0700-5619)

CharlesSchwab
Customer Center | Site Map | Log Out
Account | Trade | Quotes & Research | Alerts | Planning | Services
Overview | Retirement Planner | Schwab Portfolio Checkup™ | AdvisorSource | Mortgage

Define Tax Status

Page Help

Please enter or verify your tax rates. This information will be saved in our system and made available for use in other Schwab online tools.

Analyzer Steps

Overview
Define Tax Status
Describe Sell
Describe Buy
Results
Calculation Details Need Help? Tax Rate Assistant Combined federal and state ordinary income tax rate [  ] %

Combined federal and state long term capital gains tax rate [  ] %

[Continue]

Account | Trade | Quotes & Research | Alerts | Planning | Services         [ Site Map] [ Return to Top]
Overview | Retirement Planner | Schwab Portfolio Checkup™ | AdvisorSource | Mortgage © 2000 Charles Schwab & Co., Inc. All rights reserved. Member SIPC/NYSE.         Account Number 8967-5843
Unauthorized access is prohibited. Usage will be monitored.         Viewed on: January 14, 2000 01.10PM ET
Agreements         (0700-5619)

CharlesSchwab
Customer Center | Account | Trade | Quotes & Research | Alerts | Planning | Services
[ Site Map ] [ Log Out ]

Overview | Retirement Planner | Schwab Portfolio Checkup™ | AdvisorSource | Mortgage

Describe Sell

Please tell us about the stock or mutual fund you are considering selling:

| | | |
|---|---|---|
| Symbol | [      ] | Symbol lookup |
| Purchase Date | [  ][  ][    ] MM DD YYYY | |
| Cost per Share at Purchase | $[      ] | |
| Commission or Load on Purchase | $[      ] | |
| Number of Shares | [      ] shares | |
| Target Price per Share | $[      ] | Get current price |
| Commission or Load on Sale | $[      ] | |

[Page Help]

Analyzer Steps
Overview
Define Tax Status
Describe Sell
Describe Buy
Results
Calculation Details

[Get Results]

---

Account | Trade | Quotes & Research | Alerts | Planning | Services          [ Site Map ] [ Return to Top ]

Overview | Retirement Planner | Schwab Portfolio Checkup™ | AdvisorSource | Mortgage

---

© 2000 Charles Schwab & Co., Inc. All rights reserved. Member SIPC/NYSE.          Account Number 8967-5843
Unauthorized access is prohibited. Usage will be monitored.          Viewed on: January 14, 2000 01:10PM ET
Agreements          (0700-5619)

CharlesSchwab
Customer Center | Account | Trade | Quotes & Research | Alerts | Planning | Services
Site Map | Log Out
Overview | Retirement Planner | Schwab Portfolio Checkup™ | AdvisorSource | Mortgage

Results

Page Help

The Schwab Sell Analyzer has compiled your results. To see detailed calculations with explanatory notes, choose to View Calculations. To re-enter information, go to Recalculate.

Analyzer Steps
- Overview
- Define Tax Status
- Describe Sell
- Describe Buy
- Results
- Calculation Details Note: These results are based on your estimates. All information is time-sensitive. We recommend that you print results in order to preserve a snapshot of today's calculations.

| | |
|---|---|
| Combined federal and state ordinary income tax rate | 37.4% |
| Combined federal and state long term capital gains tax rate | 26.5% |

Tax on the Sell

| | |
|---|---|
| Capital Gain/Loss | $10,000 |
| Net Proceeds | $8,000 |
| Estimated Tax | $2,000 |

Long Term Capital Gains Tax Treatment

Currently, you have held this security for less than a year and will pay $2,000 at a short-term tax rate. If you hold this security for an additional 17 days, you will receive a long-term tax rate and pay $1,600 on a sell of the same amount.

| | |
|---|---|
| Security for Sell | ABCD |
| Purchase Date | 06 / 12 / 1245  MM DD YYYY |
| Cost per Share at Purchase | $ 15.23 |
| Commission or Load on Purchase | $ 1.50 |

Net Proceeds          $8,000
Estimated Tax         $2,000

Long Term Capital Gains Tax Treatment

Currently, you have held this security for less than a year and will pay $2,000 at a short-term tax rate. If you hold this security for an additional 17 days, you will receive a long-term tax rate and pay $1,600 on a sell of the same amount.

| | |
|---|---|
| Security for Sell | ABCD |
| Purchase Date | 06 12 1245 (MM DD YYYY) |
| Cost per Share at Purchase | $ 15.23 |
| Commission or Load on Purchase | $ 150 |
| Numbers of Shares for Sell | 200 |
| Target Price per Share | $ 37.56 |
| Commission or Load on Sale | $ 150 |

[Recalculate]  Calculate tax on the sale and compare to a new investment >

---

Account | Trade | Quotes & Research | Alerts | Planning | Services     [ Site Map ] [ Return to Top ]

Overview | Retirement Planner | Schwab Portfolio Checkup™ | AdvisorSource | Mortgage © 2000 Charles Schwab & Co., Inc. All rights reserved. Member SIPC/NYSE.      Account Number 8967-5943
Unauthorized access is prohibited. Usage will be monitored.                    Viewed on: January 14, 2000 01:10PM ET
Agreements                                                                     (0700-5619)

CharlesSchwab — Site Map | Log Out
Customer Center | Account | Trade | Quotes & Research | Alerts | Planning | Services Overview | Retirement Planner | Schwab Portfolio Checkup™ | AdvisorSource | Mortgage

Calculation Details

Page Help

Tax on the Sell

Analyzer Steps

Sale of ABCD

Overview
Define Tax Status
Describe Sell
Describe Buy
Results
Calculation Details

| | | | |
|---|---|---|---:|
| Number of shares | | | 200 |
| Target share price | x | $ | 36.84 |
| Sales proceeds | | $ | 74,000.00 |
| Commission | − | $ | 29.95 |
| Cost Basis | − | $ | 7,120.00 |
| Gain / (Loss) | | $ | 737,517.00 |
| Tax Rate | x | | 29% |
| Equals Total Tax | | $ | 19,360.00 |

Long Term Capital Gains Tax Treatment

You have already held this stock long-term and are currently benefiting from long-term rates.

Return to results >

Account | Trade | Quotes & Research | Alerts | Planning | Services       [Site Map] [Return to Top]

Overview | Retirement Planner | Schwab Portfolio Checkup™ | AdvisorSource | Mortgage © 2000 Charles Schwab & Co., Inc. All rights reserved. Member SIPC/NYSE     Account Number 8967-6843
Unauthorized access is prohibited. Usage will be monitored     Viewed on January 14, 2000 01.10PM ET
Agreements     (0700-5619)

CharlesSchwab
Customer Center | Account | Trade | Quotes & Research | Alerts | Planning | Services
| Site Map | Log Out |

Overview | Retirement Planner | Schwab Portfolio Checkup™ | AdvisorSource | Mortgage

Describe Sell

Please tell us about the stock or mutual fund you are considering selling:

| | | |
|---|---|---|
| Symbol | [ ] | Symbol lookup |
| Purchase Date | [ ] [ ] [ ] MM DD YYYY | |
| Cost per Share at Purchase | $ [ ] | |
| Commission or Load on Purchase | $ [ ] | |
| Number of Shares | [ ] shares | |
| Target Price per Share | $ [ ] | Get current price |
| Commission or Load on Sale | $ [ ] | |
| Target Return Rate | [ ] % | View historical return |

Page Help

Analyzer Steps
Overview
Define Tax Status
Describe Sell
Describe Buy
Results
Calculation Details

[Continue]

Account | Trade | Quotes & Research | Alerts | Planning | Services    [ Site Map ] [ Return to Top ]
Overview | Retirement Planner | Schwab Portfolio Checkup™ | AdvisorSource | Mortgage © 2000 Charles Schwab & Co., Inc. All rights reserved. Member SIPC/NYSE.    Account Number 8967-5843
Unauthorized access is prohibited. Usage will be monitored.    Viewed on: January 14, 2000 01:10PM ET
Agreements    (0700-5619)

CharlesSchwab | Site Map | Log Out |
Customer Center | Account | Trade | Quotes & Research | Alerts | Planning | Services Overview | Retirement Planner | Schwab Portfolio Checkup™ | AdvisorSource | Mortgage

Describe Buy

Please tell us about the stock or mutual fund you are considering buying:

| | | | Page Help |
|---|---|---|---|

Analyzer Steps

| Symbol | | Symbol lookup |
|---|---|---|
| Amount to Invest | $ 14.89 | |
| Commission or Load on Buy | $ | |
| Target Return Rate | % | View historical return |
| Anticipated Years to be Held | | |

- Overview
- Define Tax Status
- Describe Sell
- Describe Buy
- Results
- Calculation Details

[Get Results]

Account | Trade | Quotes & Research | Alerts | Planning | Services      [ Site Map ] [ Return to Top ]

Overview | Retirement Planner | Schwab Portfolio Checkup™ | AdvisorSource | Mortgage © 2000 Charles Schwab & Co., Inc. All rights reserved. Member SIPC/NYSE.      Account Number 8967-5943
Unauthorized access is prohibited. Usage will be monitored.      Viewed on: January 14, 2000 01:10PM ET
Agreements      (0700-5619)

CharlesSchwab | Site Map | Log Out
Customer Center | Account | Trade | Quotes & Research | Alerts | Planning | Services Overview | Retirement Planner | Schwab Portfolio Checkup™ | AdvisorSource | Mortgage

Results

The Schwab Sell Analyzer has compiled your results. To see detailed calculations with explanatory notes, choose to View Calculations. To re-enter information, go to Recalculate.

| Page Help |

Analyzer Steps

Overview
Define Tax Status
Describe Sell
Describe Buy
Results
Calculation Details Note: These results are based on your estimates. All information is time-sensitive. We recommend that you print results in order to preserve a snapshot of today's calculations Combined federal and state ordinary income tax rate          37.4%
Combined federal and state long term capital gains tax rate  26.5%

Tax on the Sell

Capital Gain/Loss      $10,000
Net Proceeds           $8,000
Estimated Tax          $2,000

Long Term Capital Gains Tax Treatment

Currently, you have held this security for less than a year and will pay $2,000 at a short-term tax rate. If you hold this security for an additional 17 days, you will receive a long-term tax rate and pay $1,600 on a sell of the same amount.

Minimum Return Rate or Hold Time for New Stock to Match Original

If you hold the new stock for the 20 years you estimated, it will match the value of your original investment if the new stock achieves a minimum return rate of 15%.

Or, conversely...
If the new stock achieves the 12% return rate you estimated, it will match the value of your original investment if you hold the new stock for minimum

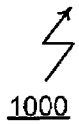

If the new stock achieves the 12% return rate you estimated, it will match the value of your original investment if you hold the new stock for minimum of 6 years.

Comparison of Current Holding and New Investment

| Action | Your Estimated Hold Time | Your Estimated Return | Net Proceeds After Tax & Commission |
|---|---|---|---|
| Hold ABCD | 20 years | 10% | $28,000 |
| Sell ABCD, buy HIJK | 10 years | 19% | $67,000 |

If you hold ABCD and achieve your estimated return rate of 10% over 20 years, your net earnings after tax and commission costs will be $28,000. If you sell ABCD and reinvest in HIJK, and then achieve your estimated return rate of 12% over 20 years, your net earnings after tax and commission cost will be $30,000. Based on these assumptions, the strongest performer over time would be HIJK.

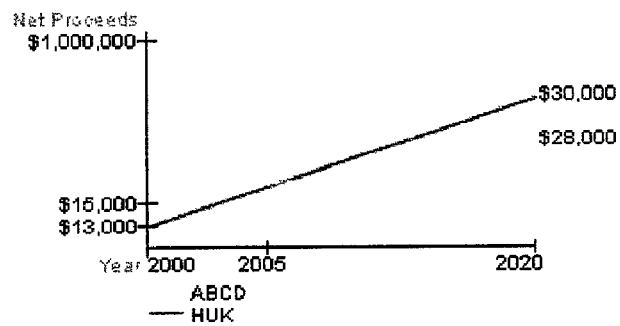

| Security for Sell | ABCD |
| Purchase Date | 06 12 1245 MM DD YYYY |
| Cost per Share at Purchase | $ 15.23 |

| | |
|---|---|
| Security for Sell | ABCD |
| Purchase Date | 06 12 1245 <br> MM DD YYYY |
| Cost per Share at Purchase | $ 15.23 |
| Commission or Load on Purchase | $ 150 |
| Numbers of Shares for Sell | 200 |
| Target Price per Share | $ 37.56 |
| Commission or Load on Sale | $ 150 |
| Target Return Rate | 8 % |
| Security for Buy | UXYZ |
| Amount to Invest | $ 3000.60 |
| Commission or Load on Buy | $ 200.60 |
| Target Return Rate | 11.1 % |
| Anticipated Years to be Held | 30 |

Recalculate

Account | Trade | Quotes & Research | Alerts | Planning | Services     | Site Map | Return to Top |
Overview | Retirement Planner | Schwab Portfolio Checkup™ | AdvisorSource | Mortgage © 2000 Charles Schwab & Co., Inc. All rights reserved. Member SIPC/NYSE.     Account Number 8967-5843
Unauthorized access is prohibited. Usage will be monitored.     Viewed on: January 14, 2000 01:10PM ET
Agreements     (0700-5619)

CharlesSchwab
Customer Center | Account | Trade | Quotes & Research | Alerts | Planning | Services
| Site Map | Log Out |

Overview | Retirement Planner | Schwab Portfolio Checkup™ | AdvisorSource | Mortgage

Calculation Details

Tax on the Sell

Sale of ABCD

| | | | |
|---|---|---|---|
| Number of shares | | | 200 |
| Target share price | x | $ | 36.84 |
| Sales proceeds | | $ | 74,000.00 |
| Commission | - | $ | 29.95 |
| Cost Basis | - | $ | 7,120.00 |
| Gain / (Loss) | | $ | 737,517.00 |
| Tax Rate | x | | 29% |
| Equals Total Tax | | $ | 19,360.00 |

Analyzer Steps
Overview
Define Tax Status
Describe Sell
Describe Buy
Results
Calculation Details

Long Term Capital Gains Tax Treatment

You have already held this stock long-term and are currently benefiting from long-term rates.

Minimum Return Rate or Hold Time for New Stock to Match Original

Sale of ABCD

| | | |
|---|---|---|
| Future value at 8% return rate | | $ 744,637 |
| Sales price | | $ 74,000 |
| Tax | - | $ 19,360 |
| Net Proceeds | | $ 54,613 |

| | | |
|---|---|---|
| Tax | - | $ 19,360 |
| Net Proceeds | | $ 54,613 |

Note: To grow the net proceeds of $54,613 to equal the future value of ABCD ($744,637) will required a return rate of 9.1% over 30 years

Comparison of Current Holding and New Investment

You have already held this stock long-term and are currently benefiting from long-term rates.

| Future Value of | | ABCD | DEFG |
|---|---|---|---|
| Return rate | | 8% | 11% |
| Future Value | | $ 744,637.00 | $ 1,250,228.00 |
| Cost basis | - | $ 7,120.00 | $ 54,613.00 |
| Gain / (Loss) | | $ 737,517.00 | $ 1,195,615.00 |
| Tax Rate | x | 29% | 29% |
| Tax subtotal | | $ 213,880.00 | $ 346,728.00 |
| In the year 2030 | | | |
| Future Value | | $ 744,637.00 | $ 1,250,228.00 |
| Tax Subtotal | - | $ 213,880.00 | $ 346,728.00 |
| Net proceeds | | $ 530,757.00 | $ 903,500.00 |

Return to results >

---

Account | Trade | Quotes & Research | Alerts | Planning | Services          [ Site Map] [ Return to Top]

Overview | Retirement Planner | Schwab Portfolio Checkup^TM | AdvisorSource | Mortgage © 2000 Charles Schwab & Co., Inc. All rights reserved. Member SIPC/NYSE.           Account Number 8967-5843
Unauthorized access is prohibited. Usage will be monitored.                        Viewed on: January 14, 2000 01:10PM ET
Agreements                                                                                              (0700-5619)

Tax Rate Assistant

1. Select your tax filing status [Single ▼]

2. Enter estimated taxable income for this year, excluding capital gains
   [_____] Help with taxable income 3. Verify that as a CA resident you are subject to the following state income and capital gains tax rates, or see state tax information to change your state or to modify these rates State income tax rates [ 9 ]%

State long term capital gain tax rates [ 4 ]%

[Calculate]

Combined Federal/State Ordinary Income Tax Rate: [   ]%

Combined Federal/State Long Term Capital Gain Tax Rate: [   ]%

[Apply and Close]

Fig. 12B

Taxable Income Calculator

Enter taxable income from last year: $[_____]
(Line 39 of form 1040)

Enter capital gains/losses from last year: $[_____]
(Line 13 of form 1040)

Expected income growth for this year, excluding capital gains. [   ]%

[Calculate]

Taxable Income $[_____]

[Apply]

Fig. 12C

SYSTEM AND METHOD FOR FORECASTING TAX EFFECTS OF FINANCIAL TRANSACTIONS

TECHNICAL FIELD OF THE INVENTION

The present invention relates generally to methods for performing online financial transactions. More particularly, the present invention includes a method for forecasting the tax consequences that would result from performing a specified financial transaction or series of transactions.

BACKGROUND OF THE INVENTION

People increasingly turn to the World Wide Web when they want to perform financial transactions of all types. This is exemplified, for example by the increasing number of people who do their banking online. Other examples include people who pay bills and trade securities using their web browsers.

The popularity of the web as a means to perform financial transactions is largely attributable to ease of use. Using the web is certainly easier than actually going to a bank or brokerage. Using the web can also be easier than performing the same transaction over the phone. This is especially true when one considers the fact that users do not typically encounter busy signals when performing web-based transactions. Users also appreciate the near constant (i.e., seven days a week, twenty-four hours a day) availability of many web services.

Still, it is often the case that users lose some level of service when they choose to do business on the web. People who use online brokerages may, for example, miss the type of guidance and advice they receive from an actual human broker or investment counselor. In many cases, losses of this nature are considered to be an acceptable trade off. This is analogous to the case of automated teller machines (ATMS) where the customer trades convenience for quality of service.

In other cases, it may not be practical or desirable to make this type of quality of service trade-off. This is often true where transactions are complex and difficult to understand. Transactions that have important or expensive consequences can be another area where it may be difficult to make a quality of service trade-off. The same concern applies where transactions involve unsophisticated or novice users.

Online brokerages are an example of all of these elements. The transactions made using an online brokerage may involve complex data and often require thorough analysis. The consequences of making bad trading decisions can (for obvious reasons) be extremely expensive. Online brokerages are also cater to a range of different users, including novice and otherwise unsophisticated users.

For these and other reasons, a need exists for systems that reduce the complexity that is associated with some types of online transactions. This is particularly important for online brokerages and other cases where transactions can be complex, expensive and involve unsophisticated users.

SUMMARY OF THE INVENTION

The present invention includes a system and method for forecasting tax effects of financial transactions. The system and method include a series of web pages. The web pages are typically associated with a financial web site, such as a web site operated by an online brokerage.

The first of these web pages allows a user to select if they wish to forecast the effect of: 1) selling an asset, or 2) selling an asset and purchasing a new asset. If the user chooses the first option, they move to a second web page where they define their federal and state tax rates. Once tax rates have been defined, the user accesses a third web page to describe the asset that they propose to sell. The tax consequences of that sale are displayed on a forth web page. The user may modify the proposed sale and return to the fourth web page. Alternatively, the user may access a fifth web page to view the calculations underlying the displayed tax consequences.

Selection of the second option in the first web page (i.e., selling an asset and purchasing a new asset) presents the user with a different sequence of web pages. This sequence starts, with the second web page where the user defines their federal and state tax rates. Once tax status has been defined, the user accesses a sixth web page to describe the asset that they propose to sell. The sixth web page is followed by a seventh web page where the user describes the asset that they are considering for purchase. The tax consequences of the sale of the old asset and the investment consequences of the entire transaction (both sale and purchase) are displayed on an eighth web page. The user may modify the proposed sale and return to the eighth web page. Alternatively, the user may access an ninth web page to view the calculations underlying the displayed tax consequences and investment analysis.

Other aspects and advantages of the present invention will become apparent from the following descriptions and accompanying drawings.

BRIEF DESCRIPTION OF THE DRAWINGS

For a more complete understanding of the present invention and for further features and advantages, reference is now made to the following description taken in conjunction with the accompanying drawings, in which:

FIG. 3 shows a first web page as provided by an embodiment of the present invention.

FIG. 4 shows a second web page as provided by an embodiment of the present invention.

FIG. 5 shows a third web page as provided by an embodiment of the present invention.

FIGS. 6A and 6B show a fourth web page as provided by an embodiment of the present invention.

FIG. 7 shows a fifth web page as provided by an embodiment of the present invention.

FIG. 8 shows a sixth web page as provided by an embodiment of the present invention.

FIG. 9 shows a seventh web page as provided by an embodiment of the present invention.

FIGS. 10A, 10B and 10C show an eighth web page as provided by an embodiment of the present invention.

FIGS. 11A and 11B show a ninth web page as provided by an embodiment of the present invention.

FIGS. 12A through 12C show a tenth web page as provided by an embodiment of the present invention.

DETAILED DESCRIPTION OF THE PREFERRED EMBODIMENTS

The preferred embodiments of the present invention and their advantages are best understood by referring to FIGS. 1 through 14 of the drawings. Like numerals are used for like and corresponding parts of the various drawings.

Environment

Figure 1:
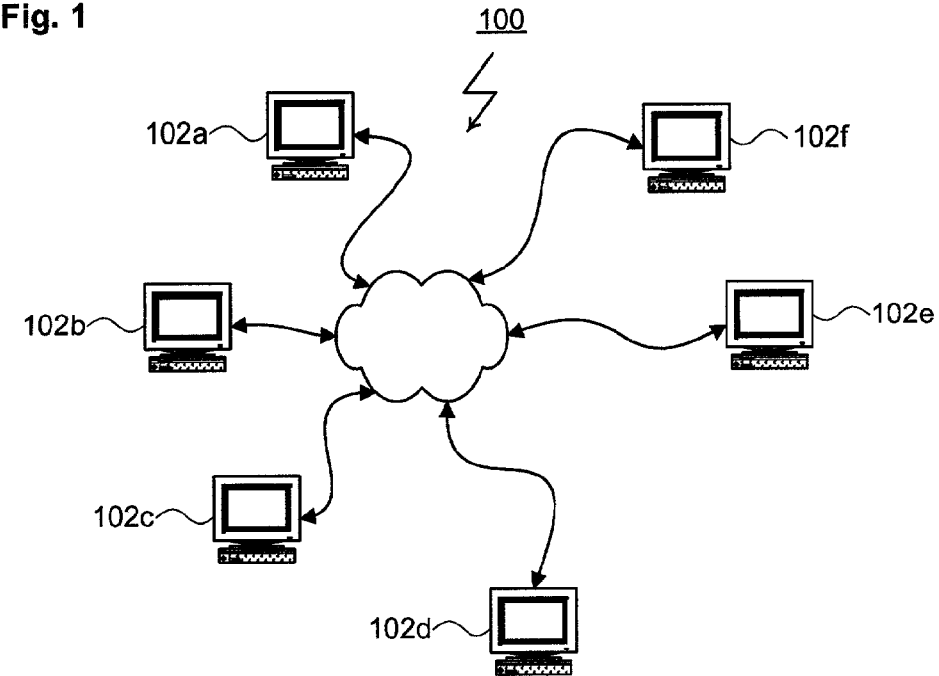
FIG. 1 is a block diagram of an Internet-like network shown as a representative environment for deployment of the present invention.

In FIG. 1, a computer network 100 is shown as a representative environment for an embodiment of the present invention. Computer network 100 is intended to be representative of the complete spectrum of computer network types including Internet and internet-like networks. Computer network 100 includes a number of computer systems, of which computer systems 102a through 102f are representative. Computer systems 102 are intended to be representative of the wide range of large and small computer systems that are used in computer networks of all types.

Figure 2:
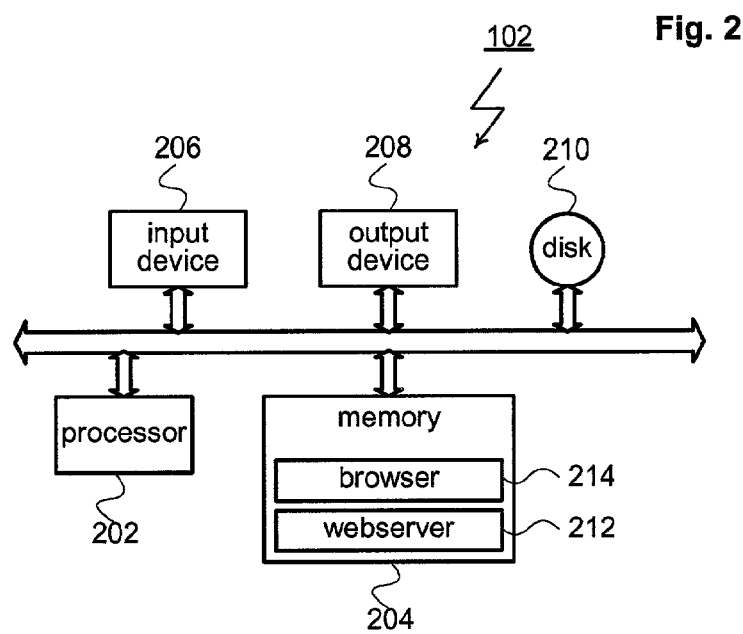
FIG. 2 is a block diagram of a computer system as used within the network of FIG. 1.

FIG. 2 shows a representative implementation for computer systems 102. Structurally, each computer system 102 includes a processor, or processors 202, and a memory 204. Processor 202 can be selected from a wide range of commercially available or custom types. An input device 206 and an output device 208 are connected to processor 202 and memory 204. Input device 206 and output device 208 represent all types of I/O devices such as disk drives, keyboards, modems, network adapters, printers and displays. Each computer system 102 may also include a disk drive 210 of any suitable disk drive type (equivalently, disk drive 210 may be any non-volatile mass storage system such as "flash" memory).

For the purposes of this description, it may be assumed that one or more computer systems 102 are configured as web servers. Other computer systems 102 may be assumed to be web clients. Computers 102 that act as web clients include a web browser program 214. Web browser programs 214 request web pages from web server programs 212 using the hypertext transport protocol (HTTP). Web server programs 214 receive these requests and, where appropriate return corresponding web pages.

System and Method for Forecasting Tax Effects of Financial Transactions

An embodiment of the present invention provides a system and method for forecasting tax effects of financial transactions. The tax determination method is embedded in a series of web pages provided by one or more of web server programs 212. Users access these web pages to forecast the tax consequences associated with performing securities transactions.

FIG. 3 shows a representative embodiment for the first web page 300 within the series of web pages. Web page 300 is an initial or overview web page intended to serve as the initial point of contact between a user and the tax forecasting method of the present invention. To this end, web page 300 includes presents two options. The first option allows the user to determine the tax consequences of selling a security. The second option expands on the sale option by including the effect of purchasing a replacement security. Web page 300 also includes a synopsis showing the user how far they have progressed in the tax forecasting method.

Selecting either of the two options within web page 300 brings the user to web page 400 (see FIG. 4). Web page 400 allows the user to enter information describing their current tax status. The required information includes the combined federal and state tax rates for both ordinary income and capital gains. In some cases, the user may not know or be unsure about the tax information required by web page 400. For this reason, web page 400 includes a link to a tax rate assistant. Activation of this link invokes a tax rate assistant to help the user define their tax status and complete web page 400. Operation of the tax rate assistant is described below.

Selecting of the first option (i.e., choosing to determine the tax consequences of selling a security) web page 300 causes web page 400 to followed by web page 500 (see FIG. 5). Web page 500 prompts the user to enter information describing the asset that they are selling (or are proposing to sell). The required information includes:

1) the asset's ticker symbol,
2) the asset's date of purchase,
3) the cost per share at purchase,
4) the load or commission paid at purchase,
5) the number of shares to be sold,
6) the target or estimated price per-share that the asset will bring when sold, and
7) the load or commission to be paid at sale.

Web page 500 includes a "Get Results" button. This button is activated by the user when they have finished entering the required information and wish to see the results of tax consequences of their proposed sale.

Activation of the "Get Results" button invokes web page 600 (see FIGS. 6A and 6B). Web page 600 is organized to provide the user with an editable, interactive summary of their proposed transaction and its calculated tax consequences. To provide the editable, interactive summary of the proposed transaction, web page 600 includes fields showing the tax rates entered by the user (see the preceding description of web page 400) or calculated by the program. These values are editable, providing the user with the option of trying different tax rates.

The editable, interactive summary of the proposed transaction Web page 600 includes fields for the remaining values previously entered by the user using web page 500. These values are also editable, providing the user with the option of experimenting with different values.

The tax consequences of the proposed transactions include fields displaying:

1) the capital gain or loss resulting from the sale,
2) the net proceeds resulting from the sale, and
3) the estimated tax resulting from the sale.

The tax consequences also describe the holding period ramifications of the proposed transaction. This description displays (where appropriate) both the long-term and short-term capital gain tax consequences of the proposed transactions. When possible, web page 600 may offer helpful tips or guidance regarding short and long term capital gains taxes (e.g., "if you hold this security for an additional fourteen days, you will receive a long-term rate.").

Web page 600 includes a "Recalculate" button. Activation of this button sends the user to a subsequent invocation of web page 600. Each subsequent invocation is updated to reflect any changes made to the editable and calculated values within web page 600. In this way, web page 600 provides a tool that allows the user to visualize the effects of a proposed transaction. The use can then make changes and experiment with the same, similar or different transactions.

In some cases, users may want to delve into the details of the calculations performed by web page 600. To this end, web page 600 includes a "View Calculations" button. Activation of this button sends the user to Web page 700.

Web page 700 (see FIG. 7) shows the user the calculations used to arrive at the values displayed in web page 600. These calculations are shown along with a "return to results"

button. This button allows the user to return to web page 600 to analyze additional transactions.

To this point, this description has focused (although not exclusively) on the case where the user selects the first option within web page 300 (i.e., choosing to determine the tax consequences of selling a security). As mentioned, web page 300 also includes a second option where the user chooses to sell an asset and purchase a replacement asset.

Selection of this second option brings the user to web page 800. Web page 800 (see FIG. 8) is similar, in some respects, to web page 500. Both web pages (500 and 800) allow the user to describe the asset that they propose to sell. Like web page 500, web page 800 prompts the user to enter:
1) the asset's symbol,
2) the asset's date of purchase,
3) the cost per share at purchase,
4) the load or commission paid at purchase,
5) the number of shares to be sold,
6) the target or estimated price per-share that the asset will bring when sold, and
7) the load or commission to be paid at sale.

Unlike web page 500, web page 800 prompts the user to enter a target return rate. After entering the required data, the user activates a "Continue" button included in web page 800.

Activation of the "Continue" button invokes web page 900. Web page 900 (see FIG. 9) prompts the user to enter information describing the asset that they are buying (or are proposing to buy). The required information includes:
1) the asset's ticker symbol,
2) the amount to invest,
3) the load or commission to be paid at purchase,
4) the target return rate, and
5) the expected number of years that the asset will be held.

Web page 900 includes a "Get Results" button. The user activates this button when they have finished entering the required information and wish to see the tax consequences of their alternatives.

Activation of the "Get Results" button invokes web page 1000. Web page 1000 (see FIGS. 10A, 10B and 10C) is organized to provide the user with: 1) an editable, interactive summary of their proposed transaction, 2) the calculated tax consequences of the proposed transaction and 3) an investment comparison between holding the user's current asset and acquiring the new asset.

To provide the editable, interactive summary of the proposed transaction, web page 1000 includes fields showing the assumptions entered by the user. These values are editable, providing the user with the option of trying assumptions.

The editable, interactive summary of the proposed transaction Web page 1000 includes fields for the remaining values previously entered by the user using web pages 800 and 900.

The tax consequences of the proposed transactions include fields displaying:
1) the capital gain or loss resulting from the sale,
2) the net proceeds resulting from the sale, and
3) the estimated tax resulting from the sale.

The tax consequences also describe the holding period ramifications of the proposed transaction. This description displays (where appropriate) both the long-term and short-term capital gain tax consequences of the proposed transactions. When possible, web page 1000 may offer helpful tips or guidance regarding short and long term capital gains taxes (e.g., "if you hold this security for an additional fourteen days, you will receive a long-term rate . . . ")

The investment comparison portion of web page 1000 compares the user's current holding (i.e., the asset that they propose to sell) with their new investment (i.e., the asset that they propose to buy). This section shows the effects of retaining the current holding at the rate of return that the user has estimated with the new investment at its projected rate or return. For most implementations, this section will present this comparison graphically, charting the relative worth of these two investments over the period that the user has estimated that they would be held.

In most cases, it is useful to present this type of time-based comparison in several textual forms. For typical implementations, this section of web page 1000 includes a calculation showing the user the number of years that they would have to retain the new asset (at a the user's estimated rate of return) given before the new asset matches the asset being sold. This section of web page will typically also tell the user the minimum rate of return required before the new investment will match the asset being sold within a given time period (e.g., twenty years).

Web page 1000 includes a "Recalculate" button. Activation of this button sends the user to a subsequent invocation of web page 1000. Each subsequent invocation is updated to reflect any changes made to the editable and calculated values within web page 1000. In this way, web page 1000 provides a tool that allows the user to visualize the effects of a proposed transaction. The use can then make changes and experiment with the same, similar or different transactions.

In some cases, users may want to delve into the details of the calculations performed by web page 1000. To this end, web page 1000 includes a "View Calculations" button. Activation of this button sends the user to Web page 1100.

Web page 1100 (see FIG. 11) shows the user the calculations used to arrive at the values displayed in web page 1000. These calculations are shown along with a "return to results" button. This button allows the user to return to web page 1000 to analyze additional transactions.

Figure 12C:
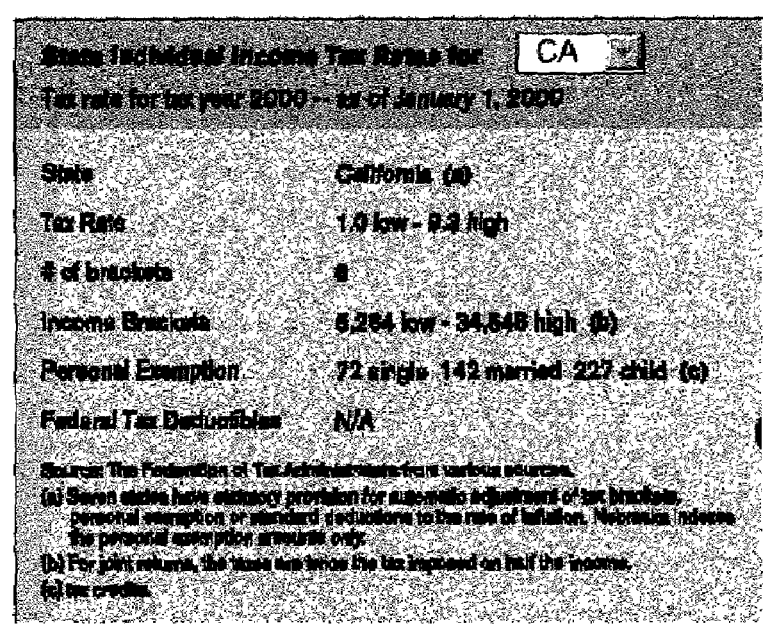

As mentioned previously, web page 400 includes a link to a tax rate assistant. Activation of this link brings the user to a tax rate assistant (see FIGS. 12A, 12B and 12C). As shown in FIG. 12A, the tax rate assistant first requires that the user enter their filing status (i.e., single, married filing jointly, etc.). The tax rate assistant also requires the user to enter their taxable income for the current year.

The tax rate assistant then looks up the user's state of residence from an internal database. The tax rate assistant uses the state of residency along with the user's filing status and current taxable income, to calculate the user's state income and long term capital gains taxes. These figures are displayed to the user. When the user activates a calculate button the user's combined (i.e. state and federal) tax rate and combined long term capital gains tax rate are also displayed.

In some cases, the user may not know their taxable income for the current year. For this reason, the tax rate assistant includes a taxable income calculator popup. As shown in FIG. 12B, activation of a "Help with taxable income" link takes the user to the taxable income calculator popup. The taxable income calculator popup requires that the user enter their taxable income and capital gains or losses from the previous year. The user is instructed to get these values from appropriate lines in the previous year's Federal Form 1040. The taxable income calculator popup also requires that the user enter the amount (in percent) that they expect their income will increase (not including capital gains). The user can then activate a calculate button to cause the taxable income calculator popup to display their taxable income.

As previously mentioned the tax rate assistant retrieves the user's state of residency from an internal database. In some cases, the database value may be incorrect (e.g., where the user has moved). In other cases, the user may wish to compare the tax consequences of living in different states.

For this reason, the tax rate assistant includes a state individual tax rates popup. As shown in FIG. 12C, activation of a "find your appropriate tax rates" link takes the user to the state individual tax rates popup. The state individual tax rates popup allows the user to select different states from a pulldown menu. For each state, the state individual tax rates popup displays relevant tax information. Selection of a particular state causes that state to be used by the tax rate assistant.

For most implementations, web pages 300 through 1100 share a set of common features. These are intended to provide the user with a uniform navigation experience. The common features typically include text and other explanatory features. Each web page also typically includes a synopsis showing the user how far they have progressed in the tax determination method (i.e. where they are and which web pages follow their current location).

Figure 13:
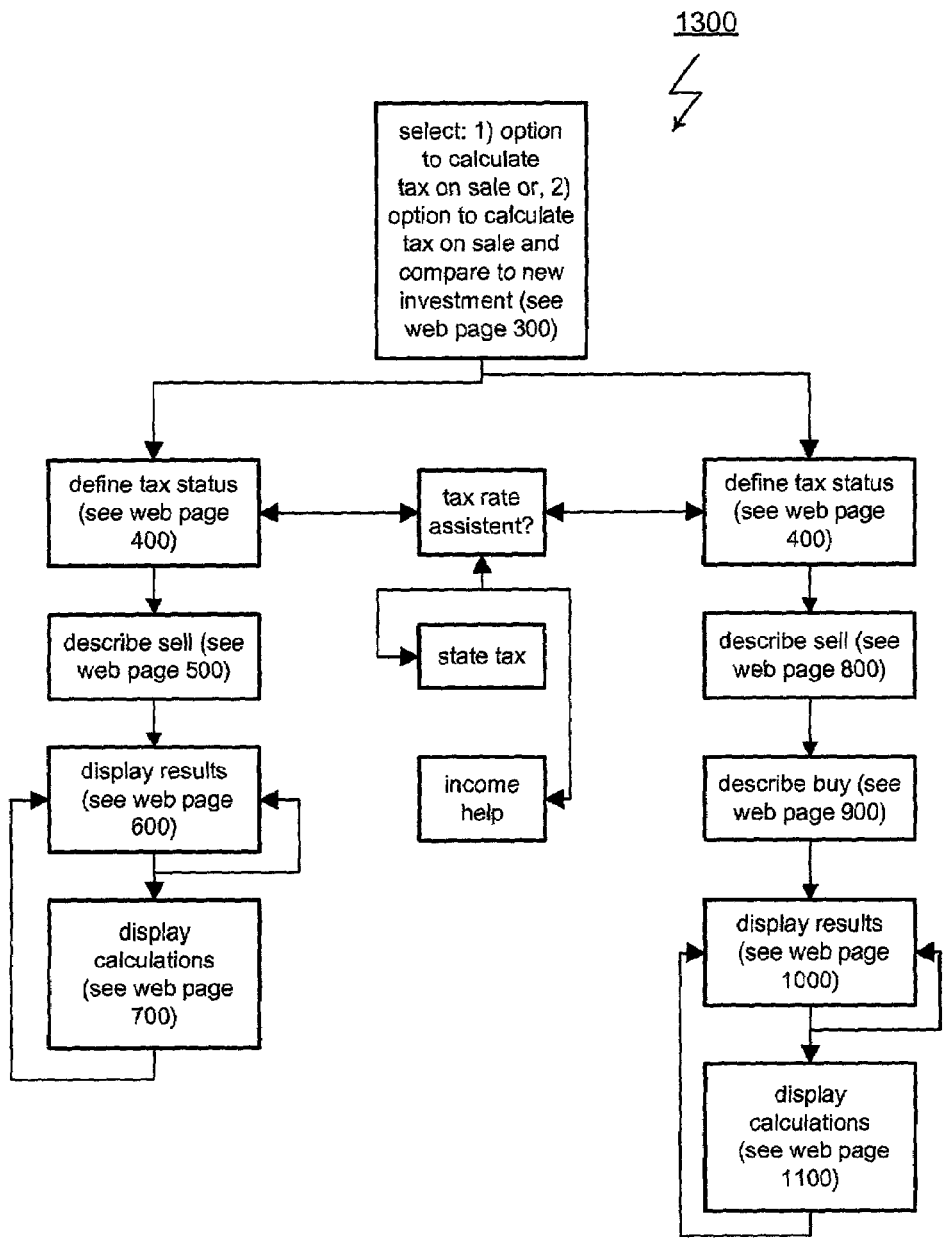
FIG. 13 is a block diagram of a roadmap interrelating the web pages of FIG. 3 through 12.

FIG. 13 is a "roadmap" that shows how users navigate between web pages 300 through 1100. As shown in FIG. 13 (and described above) the user first uses web page 300 to select: 1) to sell an asset, or 2) to sell an asset and purchase a new asset. If the user chooses the first option, they then use web page 400 to define their tax status. Once tax status has been defined, the user accesses web page 500 to describe the asset that they propose to sell. The tax consequences of that sale are displayed on web page 600. The user may modify the proposed sale and return to web page 500. Alternatively, the user may access web page 700 to view the calculations underlying the information displayed in web page 600.

The roadmap also shows path taken by the user when the select the second option on web page 300 (i.e., to sell an asset and purchase a new asset). In this case, the user accesses web page 400 to define their tax status. Once tax status has been defined, the user accesses web page 800 to describe the asset that they propose to sell. Web page 800 is followed by web page 900 where the user describes the asset that they are considering for purchase. The tax consequences of the sale of the old asset and the investment consequences of the entire transaction (both sale and purchase) are displayed on web page 1000. The user may modify the proposed sale and return to web page 1000. Alternatively, the user may access web page 1100 to view the calculations underlying the information displayed in web page 100.

Although particular embodiments of the present invention have been shown and described, it will be obvious to those skilled in the art that changes and modifications may be made without departing from the present invention in its broader aspects, and therefore, the appended claims are to encompass within their scope all such changes and modifications that fall within the true scope of the present invention.

What is claimed is:

1. In a computer system, forecasting the financial effects of holding an asset versus selling the asset and purchasing an alternative asset, where the computer system includes a memory device which stores software instructions, carrying out a method comprising the steps of:

generating a first sequence of one or more web pages, wherein the first sequence of web pages allows a user to select between a first option of calculating tax on the sale of stock or mutual fund, and a second option of comparing two investment options on an after tax basis, where a first investment option is continuing to hold a particular asset, and the second investment option is selling the particular asset, and purchasing a different asset;

in response to a user selecting the first option, generating a second sequence of one or more web pages, the second sequence of one or more web pages allowing a user to enter information describing an asset to be sold;

calculating financial effects, including an estimated capital gains tax liability, resulting from the selling of the asset described by the user in the second sequence of one or more web pages;

generating a third sequence of one or more web pages displaying the financial effects of selling the asset described in the second sequence of one or more web pages;

wherein the third sequence of one or more web pages which display the financial effects of selling the asset described by the user in the second sequence of one or more web pages, include the estimated capital gain tax from selling the asset described in the second sequence of one or more web pages;

in response to the user selecting the second option, generating a fourth sequence of one or more web pages, the fourth sequence of one more web pages allowing the user to enter information describing an asset to be sold, and to enter information regarding an asset to be purchased, wherein the information regarding the asset to be sold includes an expected rate of return of the asset to be sold, and wherein the information regarding the asset to be purchased includes an expected rate of return for the asset to be purchased;

calculating a time period required for holding the to be purchased asset to reach a value that would be equal to the value for the to be sold asset if the to be sold asset were not sold, wherein this calculation takes into the account the tax effects of selling the to be sold asset described in the fourth sequence of one or more pages;

generating a fifth sequence of one or more web pages which textually and graphically present the results of the calculating the time period;

wherein the calculating the financial effects of selling the asset identified in the second sequence of one or more web pages includes determining the capital gain or loss resulting from the sale, determining the net proceeds resulting from the sale; and determining an estimated tax resulting from the sale; and determining if the sale of the asset identified in the second sequence of one or more web pages will result in a long term, or a short term capital gain, and if the sale will result in a short term capital gain, to generate a message indicating an amount of time which the asset identified in the second sequence of web pages must be held in order to avoid the sale of the asset being treated as a short term capital gain; and the third sequence of one or more web pages displays the message indicating an amount of time which the asset identified in the second sequence of web pages must be held in order to avoid the sale of the asset being treated as a short term capital gain.

2. The method of claim 1 wherein the calculating the financial effects of selling the asset identified in the fourth sequence of one or more web pages includes determining the capital gain or loss resulting from the sale, determining the net proceeds resulting from the sale; and determining an estimated tax resulting from the sale; and determining if the sale of the asset identified in the fourth sequence of one or more web pages will result in a long term, or a short term capital gain, and if the sale will result in a short term capital gain generating a message indicating an amount of time which the asset identified in the fourth sequence of web pages must be held in order to avoid the sale of the asset being treated as a short term capital gain; and the fifth sequence of one or more web pages displays the message indicating an amount of time which the asset identified in the fourth sequence of web pages must be held in order to avoid the sale of the asset being treated as a short term capital gain.

3. The method of claim 2, including:

wherein the fifth sequence of one or more web pages includes a plurality of data fields showing information entered by the user in the fourth sequence of pages;

allowing the user to edit the information shown in the plurality of data fields in the fifth sequence of one or more web pages;

after the user has edited the information shown in the plurality of data fields in the fifth sequence of one or more web pages, recalculating the time period for holding the purchased asset so that it will have value that would be equal to the value for the sold asset if the sold had were not sold; and generating a sequence of one or more web pages displaying the recalculated time period.

4. The method of claim 3 further including:

including in each of the first sequence of one or more web pages, the second sequence of one or more web pages, the third sequence of one or more web pages, the fourth sequence of one or more web pages, and the fifth sequence of one or more web pages, a synopsis showing the user how far the user has progressed through the method of forecasting effects of financial transactions.

* * * * *

UNITED STATES PATENT AND TRADEMARK OFFICE
CERTIFICATE OF CORRECTION

PATENT NO. : 7,305,353 B1  
APPLICATION NO. : 09/798110  
DATED : December 4, 2007  
INVENTOR(S) : John T. Foley Page 1 of 1

It is certified that error appears in the above-identified patent and that said Letters Patent is hereby corrected as shown below:

In claim 2, column 8, line 64 change:  
"The method"  
to --The system--  
In claim 3, column 9, line 17 change:  
"The method"  
to --The system--  
In claim 4, column 10, line 12 change:  
"The method"  
to --The system--

Signed and Sealed this

First Day of April, 2008

JON W. DUDAS  
*Director of the United States Patent and Trademark Office*